United States Patent
White

[15] 3,657,072
[45] Apr. 18, 1972

[54] EPOXIDATION OF CIS-PROPENYLPHOSPHONIC ACID

[72] Inventor: Raymond F. White, Englishtown, N.J.
[73] Assignee: Merck & Co., Inc., Rahway, N.J.
[22] Filed: Nov. 5, 1969
[21] Appl. No.: 874,387

[52] U.S. Cl. .............................................195/81, 195/51 R
[51] Int. Cl. ..........................................................C12d 9/00
[58] Field of Search ...............................195/51 R, 28 R, 81

[56] References Cited

UNITED STATES PATENTS 2,830,935   4/1958   Shull et al.................................195/51

OTHER PUBLICATIONS

"Microbes as Chemical Reagents," Chemical and Engineering News, Oct. 1, 1956, pp. 4767–4768

Hendlin et al., "Phosphonomycin, a New Antibiotic Produced by Strains of Streptomyces," Science, Oct. 3, 1969, pp. 122–123

Leanza et al., "Phosphonomycin: Structure and Synthesis," Science, Oct. 3, 1969, pp. 123–125

Wallen et al., "Type Reactions in Fermentation Chemistry," May 1959, ARS–71–13, U.S.D.A., pp. 215–216

*Primary Examiner*—Joseph M. Golian
*Attorney*—John Frederick Gerkens, J. Jerome Behan and I. Louis Wolk

[57]   ABSTRACT

Cis-propenylphosphonic acid and its salts are converted to (−)(cis-1,2-epoxypropyl)phosphonic acid by intimately contacting said acid or salts with epoxidizing enzymes of molds. The epoxyphosphonic acid and its derivatives are valuable antibiotics active against gram-positive and gram-negative bacteria.

10 Claims, No Drawings

EPOXIDATION OF CIS-PROPENYLPHOSPHONIC ACID

BACKGROUND OF THE INVENTION

Processes for preparing (−) (cis-1,2-epoxypropyl)-phosphonic acid and salts thereof have been described in the art. Thus, this phosphonic acid has been obtained by growing certain species of Streptomyces, such as *Streptomyces fradiae*, in suitable fermentation media, and it has also been prepared chemical synthesis of the racemic acid and resolution of the racemic mixture. Both of these methods of producing the antibiotic substance possess disadvantages; the yields of the fermentation process being low and the resolution step in the synthetic process being difficult to carry out on a commercial scale. Accordingly, other methods of preparing the antibiotic substance and salts thereof have been sought which would avoid the difficulties of the known processes.

SUMMARY OF THE INVENTION

It is an object of this invention to provide an improved method of converting cis-propenylphosphonic acid and its salts to (−) (cis-1,2-epoxypropyl)phosphonic acid and its salts in good yield without the concomitant production of the unwanted (+) isomer. Another object is to provide a method of epoxidizing cis-propenylphosphonic acid and its salts in aqueous solution from which the desired epoxyphosphonic acid can be readily recovered. Other objects will be apparent from the detailed description of the invention hereinafter provided.

In accordance with this invention, cis-propenyl-phosphonic acid or a salt thereof is intimately contacted with epoxidizing enzymes of microorganisms to produce (−) (cis-1,2-epoxypropyl)phosphonic acid and salts thereof. The biochemical epoxidation of this invention is brought about with the epoxidizing activity produced by suitable species of fungi, preferably by a species of mold such as various species of *Fungi imperfecti*. These molds can be obtained from culture collections or isolated from natural sources such as soil in accordance with methods and techniques well known in this art. Examples of suitable molds that might be mentioned are various species of *Penicillium*, such as *P. purpurrescens, P. aculeatum, P. crustosum, P. charesii, P. corylophilum, P. sopii, P. puberulum, P. multicolor, P. funiculosum, P. spinulosum, P. frequentans, P. palitans, P. purpurogenum*, and *P. gilmanii*, various species of Paecilomyces such as *P. varioti*, and various species of Oidium.

The suitability of specific molds for effecting the epoxidation can be readily determined by growing a mold in suitable media, such as those shown in the examples, containing 250γ/ml. of a cis-propenylphosphonic acid salt until good growth of the culture is obtained (6 to 10 days), and then testing the culture broth for biological activity by assay with sensitive and resistant strains of *Proteus vulgaris*. The cultures having activity against the sensitive strain and no activity against the resistant strain have the desirable epoxidizing activity. The assays with *Proteus vulgaris* can be carried out by the disc assay procedures described in the art using *Proteus vulgaris* NRRL-B3361 as the sensitive strain and with *Proteus vulgaris* NRRL-B3722 as the (−) (cis-1,2-epoxypropyl)phosphonate resistant strain.

The process of this invention is carried out by intimately contacting the cis-propenylphosphonic acid compound with the epoxidizing enzyme of the mold. This can be done by culturing the mold in a suitable nutrient medium for growing the mold and adding the phosphonate at the beginning of the fermentation period. Alternatively, the phosphonate can be added aeseptically after the mold has been growing for some time.

Pursuant to another specific embodiment of this invention, the epoxidation can be effected by contacting the phosphonate compound with the enzymes produced by growing suitable molds. Thus, the epoxidation is effected by contacting the resting cells of the mold in an aqueous medium, or by first separating the enzymes from the cells in accordance with methods known in this art and contacting the phosphonate with the separated enzymes in a suitable aqueous medium. These latter methods have the advantage of simplifying the recovery of the (−) (cis-1,2-epoxypropyl)phosphonic acid salt, although it is generally preferred to add the propenyl compound to the medium in which the mold is grown and permitting the growth or fermentation to continue in the presence of the cis-propenylphosphonate.

The aqueous nutrient media suitable for growing the epoxidizing strains should contain sources of carbon and nitrogen assimilable by the mold as well as minor amounts of inorganic salts necessary for its growth. Sources of assimilable carbon usually used in fermentation processes such as dextrose, invert molasses, beet molasses, cerelose, and the like can be used. Similarly, sources of nitrogen employed in fermentation processes such as peptones, soybean meal, corn steep liquor, polypeptides, enzymatic digests of casein and the like can be utilized. In addition, the medium can contain minor amounts of mineral constituents such as soluble salts of magnesium, sodium, potassium, and the like as well as growth factors, such as vitamins, or other growth stimulating substances can be added to the medium. Suitable media are shown in the illustrative examples hereof.

The nutrient medium is usually inoculated with a vegetative growth of the mold although it can also be inoculated by adding spores of the mold to the medium. Growth of the microorganism is promoted by conducting the incubation at temperatures of between about room temperature and 30° C. although higher or lower temperatures can be used depending upon the optimal temperature for growing particular molds. The pH of the medium is not critical and is adjusted to that required for optimal growth of the particular mold, usually between about 6.0 and 8.0. The growth of the mold is carried out aerobically in accordance with methods well known in this art. The time required to effect the desired epoxidation varies with the particular mold used, but generally it is desirable to permit the fermentation to continue until good growth of the mold is achieved. Thus, it may be necessary to continue the fermentation for as long as 10 days.

The concentration of the cis-propenylphosphonate in the medium is not unduly critical and concentrations of 0.1 to 5 g. per liter can be used; the optimum amount for each mold being readily determined by a few simple experiments. The phosphonate salt can be added to the medium containing the epoxidizing enzymes, or one in which they are produced, in the form of a solution in a suitable biologically acceptable solvent; for example, water, a lower alcohol or a glycol, in the form of a suspension in a suitable liquid, or in the form of a solid, preferably in a very finely divided form. Generally, it is preferred to add the phosphonate to the medium in the form of a water solution of a soluble salt such as an alkali metal salt or an amine salt, although it can also be added as an insoluble salt or as the acid per se.

The processes of this invention produce primarily the (−) form of (cis-1,2-epoxypropyl)phosphonic acid which can then be readily recovered from the medium in which the epoxidation is carried out by methods known in this art. Thus, it can be adsorbed on a basic anion exchange resin on the chloride cycle and then eluted with aqueous sodium chloride. Alternatively, the epoxyphosphonic acid can be separated by adsorption on activated alumina from which it can be eluted with aqueous or aqueous alcoholic solutions of ammonium hydroxide.

The examples which follow illustrate methods of carrying out the present invention.

EXAMPLE I

A medium containing 0.8 percent nutrient broth (Difco), 0.2 percent yeast extract, 3 percent dextrose and 0.3 percent malt extract in distilled water was prepared and the pH adjusted to 7.0. 10 ml. of the resulting medium was dispensed to 25 × 200 mm. test tubes which were then sterilized by autoclaving at 121° C. for 15 minutes.

An inoculum suspension was prepared by adding a lyophilized culture of Penicillium purpurrescens NRRL-720 to 5 ml. of the sterilized medium described above. The resulting inoculum suspension was used to inoculate one of the test tubes containing 10 ml. of the sterilized medium and a second tube containing 10 ml. of the sterilized medium to which was added 1 ml. of a sterile aqueous solution containing 250γ of sodium cis-propenylphosphonate.

The inoculated tubes were incubated at 28° C. on a mechanical shaker operating at 220 rpm until good growth of the culture was observed. After 6 days the incubated broths were centrifuged (25,000 × G) to separate the cells and the supernatant broth was examined for biological activity by disc assay with sensitive and resistant strains of Proteus vulgaris with the following results:

|  | Inhibition Zone (mm) | |
| --- | --- | --- |
|  | Sensitive | Resistant |
| Control medium | 0 | 0 |
| Medium containing phosphonate | 21 | 0 |

An uninoculated tube containing 10 ml. of the sterilized medium and 1 ml. of an aqueous solution containing 250γ of sodium cis-propenylphosphonic acid was also incubated with the two inoculated tubes. After 6 days the tube was centrifuged and the supernatant liquid was found to be inactive in the Proteus vulgaris assays.

EXAMPLES 2–20

Using the procedures of Example 1 with the molds listed below, the following results were obtained with the inoculated tubes containing 250γ of sodium cis-propenyl-phosphonate:

|  |  | Inhibition Zone (mm) | |
| --- | --- | --- | --- |
| Ex. No. | Mold | Sensitive | Resistant |
| 2 | P. crustosum NRRL-949 | 24.0 | 0 |
| 3 | P. charesii NRRL-778 | 35.0 | 0 |
| 4 | P. aculeatum QM-2840 | 31.5 | 0 |
| 5 | P. corylophilum Qm-3115 | 25.5 | 0 |
| 6 | Paecilomyces varioti[1] | 27.0 | 0 |
| 7 | Oidium sp. Qm—696 | 26.0 | 0 |
| 8 | P. soppii NRRL-912 | 42.0 | 0 |
| 9 | P. funiculosum NRRL-1132 | 23.0 | 0 |
| 10 | P. puberulum NRRL-988 | 16.0 | 0 |
| 11 | P. multicolor Qm-96d | 26.0 | 0 |
| 12 | P. funiculosum NRRL-1768 | 33.0 | 0 |
| 13 | P. frequentans NRRL-1189 | 20.0 | 0 |
| 14 | P. spinulosum NRRL-727 | 32.0 | 0 |
| 15 | P. spinulosum NRRL-728 | 41.0 | 0 |
| 16 | P. spinulosum QM-108b | 37.0 | 0 |
| 17 | P. frequentans NRRL-763 | 34.0 | 0 |
| 18 | P. palitans NRRL-966 | 32.0 | 0 |
| 19 | P. purpurogenum QM-17j | 15.0 | 0 |
| 20 | P. gilmanii[2] | 26.0 | 0 |

1. Instituo Oswaldo Cruz, Rio de Janiero, Brazil

2. Dr. F. Rice, American University, Washington, D.C.

NRRL— Northern Utilization Research and Development Division, U. S. Department of Agriculture, Peoria, Illinois QM — Army Quatermaster Collection, Quatermaster Research and Development Center, U. S. Army, Natick, Massachusetts In each instance the clarified broth of the control test run in the same medium without the added phosphonate salt had no activity when tested by the same assay procedures.

EXAMPLE 21

A medium consisting of 0.8 percent nutrient broth, 0.2 percent yeast extract, 3 percent cerelose and 0.3 percent malt extract was prepared and the pH adjusted to 7.0. The medium was dispensed, 40 ml. to a 250 ml. Erlenmeyer flask, autoclaved at 121° C., 15 p.s.i. for 15 minutes. The medium was inoculated with a loopful of inoculum from an agar slant with one of the following microorganisms: Penicillium purpurrescens NRRL-720, P. soppii NRRL-912, P. spinulosum NRRL-728.

The flasks were incubated on a mechanical shaker (220 rpm) at 28° C. until the cultures were well grown (2 to 4 days). This inoculum suspension was used to inoculate flasks containing 40 ml. of the medium described above and flasks containing 40 ml. of the medium to which cis-propenylphosphonic acid had been added (200γ/ml.). The flasks were incubated on a mechanical shaker (220 rpm) at 28° C. until the cultures were well grown (6 to 10 days). After incubation the cells were removed by centrifugation (25,000 × G) and the supernatant fluids examined for biological activity by disc assay with sensitive and resistant strains of Proteus vulgaris.

|  |  | Inhibition Zone (mm) | |
| --- | --- | --- | --- |
| Culture | Cis-propenyl-phosphonate | Sensitive | Resistant |
| P. purpurrescens | − | 0 | 0 |
| P. purpurrescens | + | 30 | 0 |
| P. spinulosum | − | 0 | 0 |
| P. spinulosum | + | 35 | 0 |
| P. soppii | − | 0 | 0 |
| P. soppii | + | 40 | 0 |

The activity of 450 ml. of fermentation broth, obtained by growing Penicillium soppii NRRL-912 in shake flasks as described above, was adsorbed on a 36 cm. column of a strongly basic polystyrene type anion exchange resin (Dowex 1 × 2) on the chloride cycle. The resin adsorbate was then eluted with 3 percent aqueous sodium chloride in fractions of 5 ml. each. Fractions 15 through 24 containing all of the bio-activity were combined and freeze dried to afford 1.94 g. of solids. The solids were dissolved in 10.0 ml. of water and adjusted to pH 5.70 by the addition of 1.65 ml. of 2.5N HCl. This solution was passed through a 15 cm. column of acid washed alumina and then washed with 15 ml. of water, followed by 15 ml. of 3:1 methanol-water. All of the bio-activity was adsorbed on the column of alumina and was eluted with 1N ammonium hydroxide in 3:1 methanol-water in fractions of 5 ml. each. The bio-activity, which started to appear in fraction 3, was present in fractions 3 to 8; most of the activity being present in fractions 3 and 4. Fraction 3, which contained 3.00 mg. of (-) (cis-1,2-epoxypropyl)phosphonic acid by bioassay, was freeze dried to afford 324.0 mg. of solid residue. This solid product was slurried three times with 3 ml. of methanol with slight warming and the extracts were concentrated to obtain 120.6 mg. of amorphous solids which by bioassay contained 1.85 percent of (−) (cis-1,2-epoxypropyl)phosphonic acid. Vapor phase chromatography of the amorphous solids showed that the solids contained 1.2 percent of (−) (cis-1,2-epoxypropyl)phosphonic acid and none of the (+) isomer.

Various changes and modifications in the procedures herein disclosed will occur to those skilled in the art, and to the extent that such changes and modifications are embraced by the appended claims, it is to be understood that they constitute part of our invention.

I claim:

1. A process for producing (−) (cis-1,2-epoxypropyl)phosphonic acid or a salt thereof which comprises intimately contacting cis-propenylphosphonic acid or a salt thereof in an aqueous medium with an epoxidizing enzyme produced by growing a mold of the class of Fungi imperfecti in an aqueous nutrient medium.

2. The process of claim 1 wherein the mold is a species of Penicillium.

3. The process of claim 1 wherein the mold is P. purpurrescens, P. crustosum, P. charesii, P. aculeatum, P. corylophilum, Paecilomyces varioti, Oidium sp., P. soppii, P. funiculosum, P. puberulum, P. multicolor, P. spinulosum, P. frequentans, P. palitans, P. purpurogenum or P. gilmanii.

4. A process for producing (−) (cis-1,2-epoxypropyl)phosphonic acid or a salt thereof which comprises growing an epoxidizing mold of the class of Fungi imperfecti in an aqueous nutrient medium in the presence of cis-propenylphosphonic acid or a salt thereof.

5. The process of claim 4 wherein the mold is a species of Penicillium.

6. The process of claim 4 wherein the mold is P. purpurrescens, P. crustosum, P. charesii, P. aculeatum, P. corylophilum, Paecilomyces varioti, Oidium sp., P. soppii, P. funiculosum, P. puberulum, P. multicolor, P. spinulosum, P. frequentans, P. palitans, P. purpurogenum or P. gilmanii.

7. A process for producing (−) (cis-1,2-epoxypropyl)phosphonic acid or a salt thereof which comprises intimately contacting cis-propenylphosphonic acid or a salt thereof in an aqueous medium with an epoxidizing enzyme produced by growing a mold of the class of Fungi imperfecti in an aqueous nutrient medium and recovering (cis-1,2-epoxypropyl)phosphonic acid or a salt thereof from the resulting reaction mixture.

8. The process of claim 7 wherein the mold is a species of Penicillium.

9. The process according to claim 7 wherein the mold is grown in the presence of cis-propenylphosphonic acid or a salt thereof.

10. The process of claim 7 wherein the mold is P. purpurrescens, P. crustosum, P. charesii, P. aculeatum, P. corylophilum, Paecilomyces varioti, Oidium sp., P. soppii, P. funiculosum, P. puberulum, P. multicolor, P. spinulosum, P. frequentans, P. palitans, P. purpurogenum or P. gilmanii.

* * * * *